Dec. 26, 1933.    A. L. STEWART    1,940,703
METHOD OF AND MACHINE FOR PRODUCING GEARS
Filed Aug. 10, 1931    4 Sheets-Sheet 1

INVENTOR
Arthur L. Stewart
BY
his ATTORNEY

Dec. 26, 1933.  A. L. STEWART  1,940,703
METHOD OF AND MACHINE FOR PRODUCING GEARS
Filed Aug. 10, 1931  4 Sheets-Sheet 4

INVENTOR
Arthur L. Stewart
BY
his ATTORNEY

Patented Dec. 26, 1933

1,940,703

UNITED STATES PATENT OFFICE 1,940,703

METHOD OF AND MACHINE FOR PRODUCING GEARS

Arthur L. Stewart, Rochester, N. Y., assignor to Gleason Works, Rochester, N. Y., a corporation of New York Application August 10, 1931. Serial No. 556,169

18 Claims. (Cl. 90—5)

The present invention relates to the production of gears and particularly to the production of non-generated straight toothed bevel and hypoid gears.

One object of the present invention is to provide a method of finish-cutting straight-toothed gears particularly bevel and hypoid in a completing operation directly from the solid, that is, a method of roughing and finishing gears in a single operation with a single set-up of the gear cutting machine.

A further object of the invention is to provide a method of finish-cutting straight-toothed gears with a completing milling cutter in which certain cutting edges of the cutter effect the roughing operation and the other or finish cutting edges of the cutter are saved for the finishing operation, the purpose being to produce finished tooth surfaces on the completed gear comparable in smoothness to those of gears cut according to the present practice in separate roughing and finishing operations with separate roughing and finishing tools. This feature is of especial value with regard to non-generated gears for one of the principal objections to the use of such gears heretofore has been the poor tooth-surface finish obtainable in the forming or non-generating process.

A further object of the invention is to provide a method of cutting straight-toothed gears having straight or non-generated tooth profiles which will be faster and less costly than any method heretofore suggested for the production of such gears.

A still further object of the invention is to provide, also, a simple and practical form of machine for carrying out the new process.

In cutting gears, it has been the practice, heretofore, to rough out the blank before finish cutting it, the finish operation being a separate step in manufacture from the roughing operation, effected with a different machine set-up, preformed with different tools and ordinarily on a different machine. With the present invention, as indicated, tooth surfaces are finished directly from the solid with a completing tool, in a single set-up and on a single machine.

In producing gears according to the present invention, disc milling cutters are employed as the cutting tools. A single cutter may be used at a time, but preferably two cutters are employed simultaneously. With a single cutter, each tooth space may be roughed out and one side surface of each finished in a single operation, but some re-adjustment of the tool or blank is required after one side face of all the teeth has been finished in order to finish the opposite side faces. With two cutters, the tooth spaces can be roughed out and opposite side tooth faces can simultaneously be finish cut. Thus with two cutters, a gear can be cut completely from the solid in one operation without any re-adjustment being necessary. Moreover, since the two cutters will be operating simultaneously in two different tooth spaces, faster production will be possible.

The cutter or cutters used are of so large a diameter that they will cut the teeth for their full length without requiring traverse of the cutter or cutters across the face of the blank and that the curvature of the bottoms of the tooth spaces so produced is negligible. The cutters used, moreover, are preferably of the type having cutting edges at one side lying in a plane perpendicular to the axis of the cutter. The cutting edges on the opposite side may be arranged in a conical surface and will preferably be inclined to the axis of the cutter at an angle equal to twice the pressure angle of the tooth to be cut in the blank, that is, at an angle equal to the included angle between two adjacent side tooth faces of the gear to be cut. In cutting each tooth space of the blank, a relative depthwise or roughing feed movement is first imparted between the tool or tools and the blank end, when full depth position has been reached, a relative sidewise or finishing feed movement. The depthwise or roughing feed movement is in a direction so inclined to the plane side of the cutter or cutters that the depthwise or roughing cut is taken by the conical side of the cutter and by the tops of the cutting blades and the plane or finishing side of the cutter does no rough cutting. As soon as full depth position is reached, the relative sidewise movement of the cutter begins and in this movement the plane side of the cutter comes into operation and finishes one side of the tooth space. Then the cutter or cutters is or are withdrawn from engagement with the blank and the blank indexed. Alternate cutting and indexing proceeds until all of the tooth spaces have been cut. Where two cutters are used, they can be arranged to finish cut opposite sides of the teeth and when the blank has been indexed through one revolution, the gear will have been completed.

The present process results not only in a saving in production time due to elimination of extra set-up and chucking, but also makes possible a material lowering of production costs through elimination of specialized machinery and specialized cutting tools.

Since the plane side of the cutter does no work during the roughing of a tooth space but is saved for the finishing cut, the same high degree of finish can be obtained on the tooth profile as has been obtainable heretofore in a separate finishing process and, moreover, the cutting tool will have a long life between grinds.

In the drawings:—

Figures 1 to 3 inclusive illustrate diagrammatically the improved method of cutting gears, Figure 1 showing the tool and blank out of engagement with the tool about to begin its cut and indicating the direction of the roughing feed, Figure 2 showing the positions of the tool and blank at the end of the roughing feed and indicating the general direction of the finishing feed, and Figure 3 showing the relative positions of tool and blank at the end of the finishing cut;

Figures 1, 2, 3:
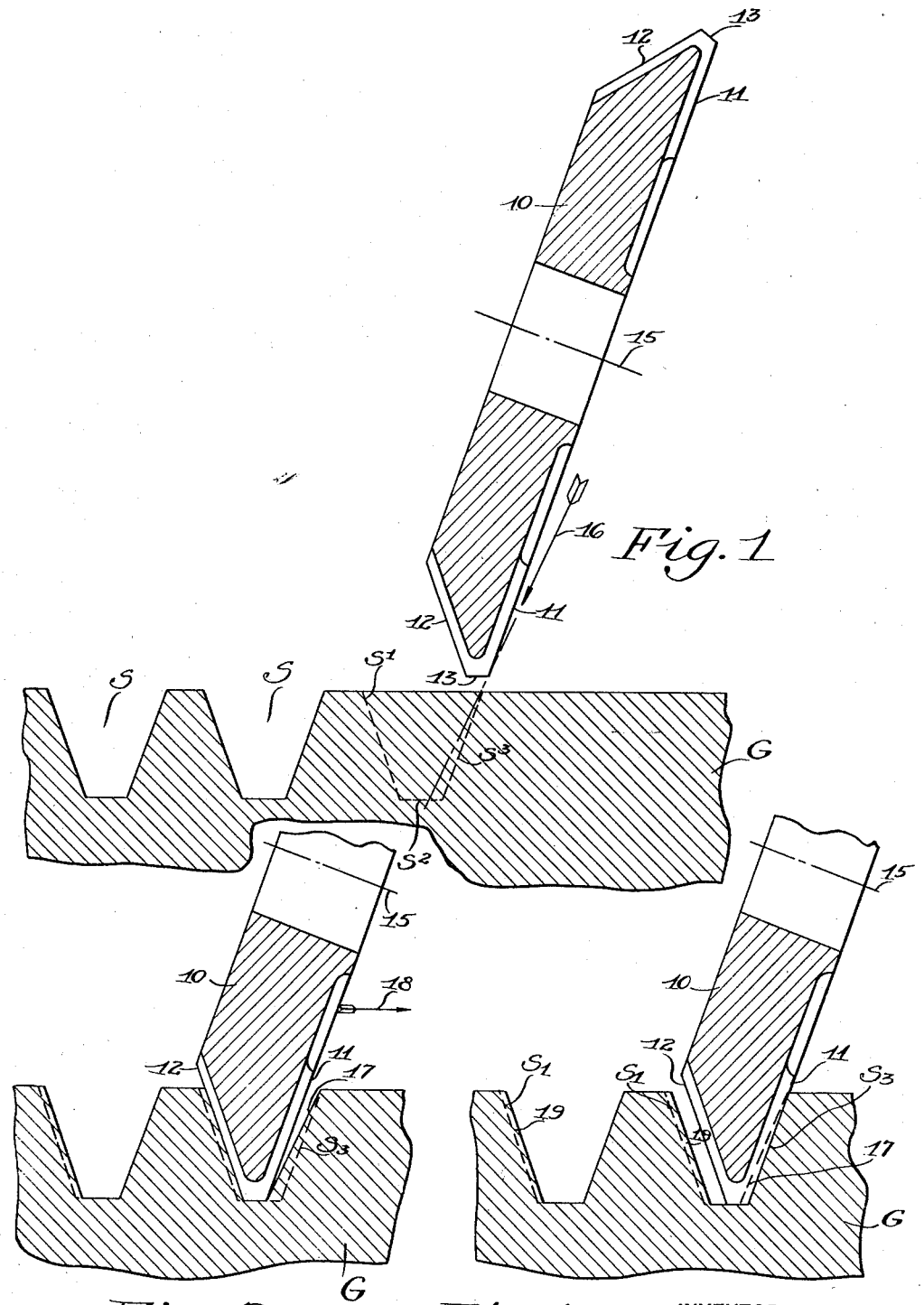

Referring first to Figures 1 to 3 inclusive, 10 designates the cutter and G the gear to be cut. The cutter is of the disc-milling type and may either have inserted cutting blades or cutting teeth formed integral with the body of the cutter. The latter type is shown in the drawings. 11 and 12 designate the opposite side cutting edges of the cutter and the top cutting edges are designated at 13.

The cutting edges 11 are perpendicular to the axis 15 of the cutter and they all lie in a plane perpendicular to this axis. The cutting edges 12 are preferably inclined to the axis of the cutter, being arranged in a conical surface coaxial with the cutter. The angle between the cutting edges 11 and 12 of each cutting tooth is preferably made equal to twice the pressure angle of the teeth of the gear to be cut, that is, it is preferably made equal to the angle between two sides of a tooth space of the gear to be cut. In this way the tooth spaces of the blank can be roughed more closely to finished size during the roughing feed.

The preferred method of cutting is to position the cutter so that its plane side is inclined to the pitch surface of the blank at an angle corresponding to the pressure angle of the teeth to be cut in the blank. In this case, after the cutter has been fed into depth, the finishing cut can be obtained by straight sidewise movement of the cutter and finished tooth surfaces of the correct pressure angle will be produced on the blank. However, as the only requirement of the process is that in finish-cutting position, the cutter shall be correctly positioned to cut a tooth surface of the correct pressure angle, it will be seen that the adjustment and feed of the cutter can be varied within a wide range. In the drawings, the cutter is shown as positioned according to the preferred method. The plane side of the cutter is inclined to the pitch surface of the blank at an angle corresponding to the pressure angle of the teeth to be cut. This adjustment can most readily be secured by adjusting the cutter angularly so that its axis is inclined to the pitch plane of the blank at an angle equal to the pressure angle of the gear to be cut.

The plane side of the cutter is the finishing side. To relieve this side of the burden of the roughing cut, the cutter is not fed directly into depth in a direction perpendicular to the root surface of the blank as in the ordinary process of cutting gears with a milling cutter, but is fed into depth along a line inclined at an acute angle to the plane side of the cutter and less inclined to the pitch surface of the blank than in the plane side of the cutter.

In Figures 1 to 3 of the drawings, the gear blank being cut is shown as a rack G, but this is primarily for the purpose of illustration as the principal application of the invention is to the production of non-generated gears, spur, bevel and hypoid. In Figure 1, two tooth spaces S of the blank have been cut and the cutter is about to commence the cutting of a new tooth space whose final boundaries are indicated by the dotted lines $S^1$, $S^2$ and $S^3$.

The arrow 16 indicates the direction of the depthwise or roughing feed. As described, this roughing feed is in a direction inclined to the plane side of the cutter and less inclined to the pitch surface of the blank than is the plane side of the cutter. In this movement, the rotating cutter is moved relative to the blank G from the position shown in Figure 1 to the position indicated in Figure 2. In this movement, a slot of the correct depth will be cut in the blank by the sides 12 and the tips 13 of the teeth of the cutter but the cutting edges 11 of the plane side of the cutter will not be in operation because of the direction of feed. These finish-cutting edges will be relieved from the burden of the roughing cut and will be kept sharp for the finishing operation.

When the cutter has reached full depth position shown in Figure 2, there will be metal included between the line 17 and the line $S^3$ and between the line 19 and the line $S^1$ still left on the sides of the tooth space which must be removed to produce the finished tooth surface. When the cutter has reached full depth position shown in Fig. 2, it is shifted sidewise relative to the blank as indicated by the arrow 18 and is moved in this direction until the cutter has reached the position shown in Figure 3. In this position, the plane side of the cutter will sweep out the finished tooth surface $S^3$ of the tooth space and thus one side surface of a tooth will be finished. The cutter is then withdrawn from engagement with the blank and the blank indexed to bring another portion of the blank into position for cutting of a new tooth space therein.

The stock left between the lines 19 and $S^1$ may be removed with another cutter operating at another point around the gear, as will be described hereinafter, or the cutter 10 or blank G may be re-adjusted after all of the tooth spaces have been roughed and one side thereof finished, so that when the cutter is again fed into depth and shifted sidewise relative to the blank, the sides 11 of the cutting teeth will finish-cut the sides $S^1$ by removing the stock between the lines 19 and $S^1$.

It is to be noted that the finish cutting edges 11 cut only during the finishing operation and are called upon then to remove only a very slight amount of stock from the blank. The burden placed upon these finish cutting edges by the present process is no greater than required of finish-cutting tools in present practice where the finishing operation is a separate operation from the roughing cut. As a result, the finished tooth sides of a gear cut by the present invention will have a finish equal to that of gears cut by the present practice, so that with the present invention, increased production and lower costs are obtained without any reduction in quality standards.

In describing the process so far, we have referred to the roughing and finishing feed movements as movements of the cutter. It will be understood, however, that either or both of these movements may be imparted instead to the blank, the cutter being held stationary except for its rotation and the blank being fed along the line 16 into the cutter for depth or along the line 18 into the side 11 of the cutter for finishing. It will be understood that the finishing feed may be imparted to the blank either by a straight-line bodily movement of the blank into the tool or a slight rotational movement of the blank after the tool has reached full depth position or in any other suitable manner as will hereinafter appear.

In practice, it is preferred to employ two cutters so that opposite tooth sides of the blank may be finished simultaneously. In Figures 4 to 7 inclusive, this preferred method of cutting is illustrated and also the cutting of non-generated tapered gears, which is the principal field of application of the invention.

The two cutters 25 and 26 are preferably so spaced angularly that they cut at opposite sides of the blank B to provide a balanced condition and minimize any tendency towards vibration resulting from the heavy roughing cuts. The two cutters are adjusted relative to one another so that their plane cutting sides are inclined to one another to cut lengthwise tooth surfaces on opposite sides of the teeth of the blank which converge at the proper angle. This is illustrated most clearly in Figure 7. The axis of the cutter 25 is indicated at 27 and the axis of the cutter 26 at 28. In finish cutting position, the finish cutting edges of the two cutters are to lie in planes 29 and 30, respectively, inclined at an angle A to one another determined by the angle of convergence of opposite sides of the teeth of the blank, the angle A depending, also, of course, on the angular distance between the cutters. In finish cutting position, the planes 29 and 30 of the cutters must also be inclined to the axis 32 of the blank B at an angle corresponding to the pressure angles of the tooth surfaces to be cut on the blank. That is, in finish cutting position, the line 34 of intersection of the two planes 29 and 30 must be inclined to the axis 32 of the blank at an angle P equal to the pressure angle of the tooth surfaces of the gear to be produced.

In adjusting the cutters and blank initially, the cutters may be positioned so that the planes 29 and 30 of their finish cutting edges will ordinarily be inclined to the blank in accordance with the pressure angle of the tooth surfaces to be produced, but this is not necessary for the cutters may, if desired, be shifted into these positions, after full depth position has been reached, by a swinging finishing movement of either the cutters themselves or the blank. In the first case, the finishing feed can be a straight line feed as described above.

In roughing, both cutters are fed into depth just as is the case with a single cutter, by movement of the cutters or the blank along some line 35 inclined at an angle F to the line 34 of intersection of the planes 29 and 30, that is, in a direction inclined to the plane cutting sides of the cutters and less inclined to the pitch plane of the blank than are the plane sides of the cutters. As above indicated, this relieves the finishing edges of the cutting teeth from the burden of roughing. When the cutters have reached full depth position, both cutters or the blank are shifted just as is the case with a single cutter so that in final cutting position, the finish cutting edges of the cutters will sweep out finished side tooth surfaces of the blank. The planes of the finish cutting sides of the two cutters will coincide with the planes 29 and 30 and the finish cutting sides of the two cutters will produce two finished tooth surfaces 37 and 38 on the blank. These two sides 37 and 38 are opposite side tooth surfaces of two different teeth of the blank and by reason of the shape of the cutters will be plane. But, as the cutters have no feed or displacement across the face of the blank B, the bottoms of the tooth slots 39 and 40 will be curved and the sides 41 and 42 of these tooth slots, which are cut by the conical sides of the cutters 25 and 26, will also be curved.

After the cutting of the two tooth spaces 39 and 40, the cutters and blank are withdrawn out of engagement and the blank is indexed. It will be seen that when the blank has been indexed far enough to bring the tooth space 39 into the position occupied by the tooth space 40 in Figure 7, the plane side of the cutter 26 will finish the side 41 of this tooth space, producing a plane tooth side converging with the plane tooth side 37 at the blank apex. Likewise, when the blank has been indexed far enough for the tooth space 40 to occupy the position of the tooth space 39 in Figure 7, the side 42 of the tooth space 40 will be finish cut by the plane side of the cutter 25 and a plane tooth surface produced on the blank which converges with the side 38 at the blank apex. Thus in one revolution of the blank, both sides of all the teeth of the blank will be finished.

Figure 4:
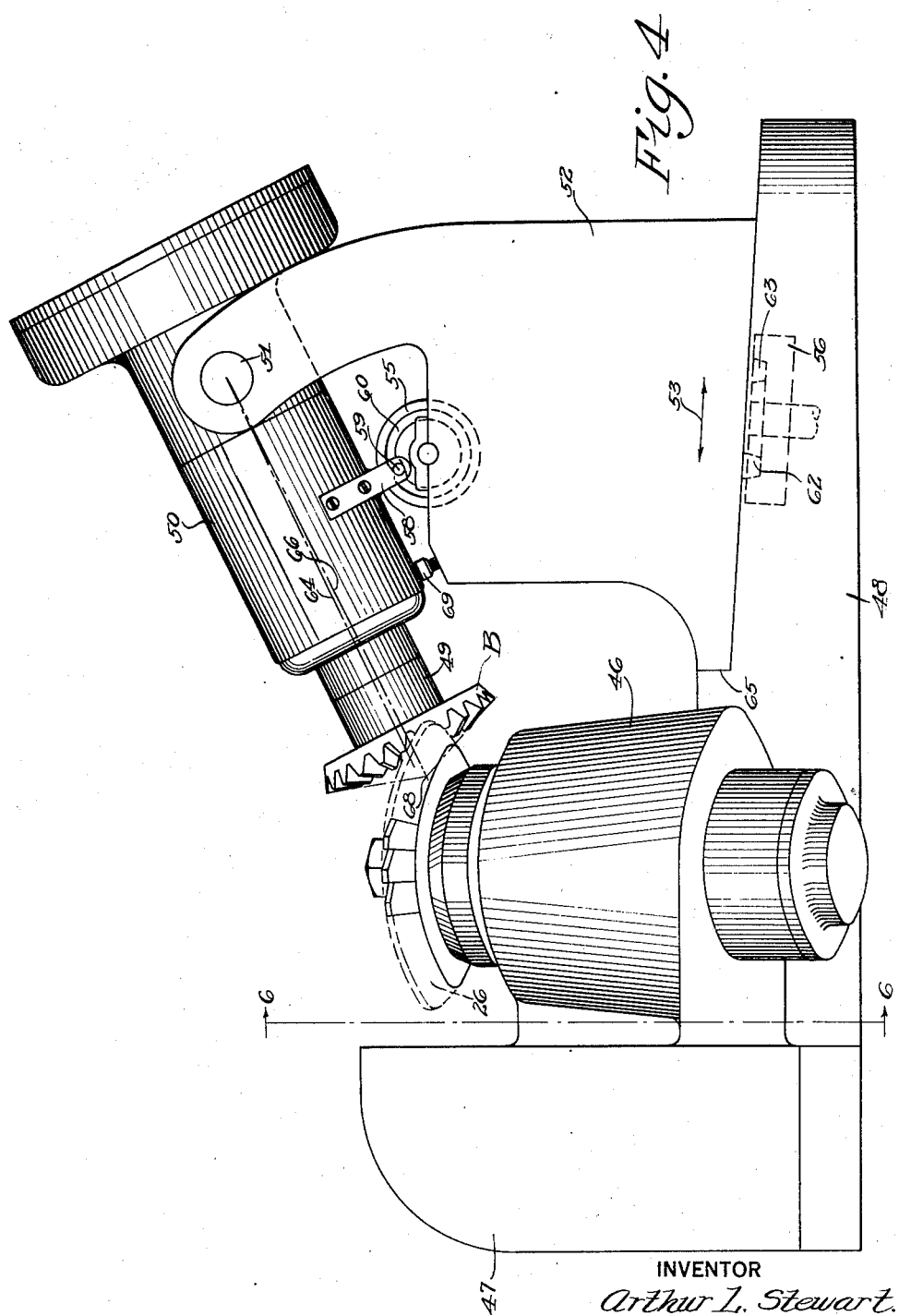
Figure 4 is a more or less diagrammatic view, showing, in side elevation, one embodiment of a bevel gear cutting machine constructed to operate according to the present invention.
Figure 5:
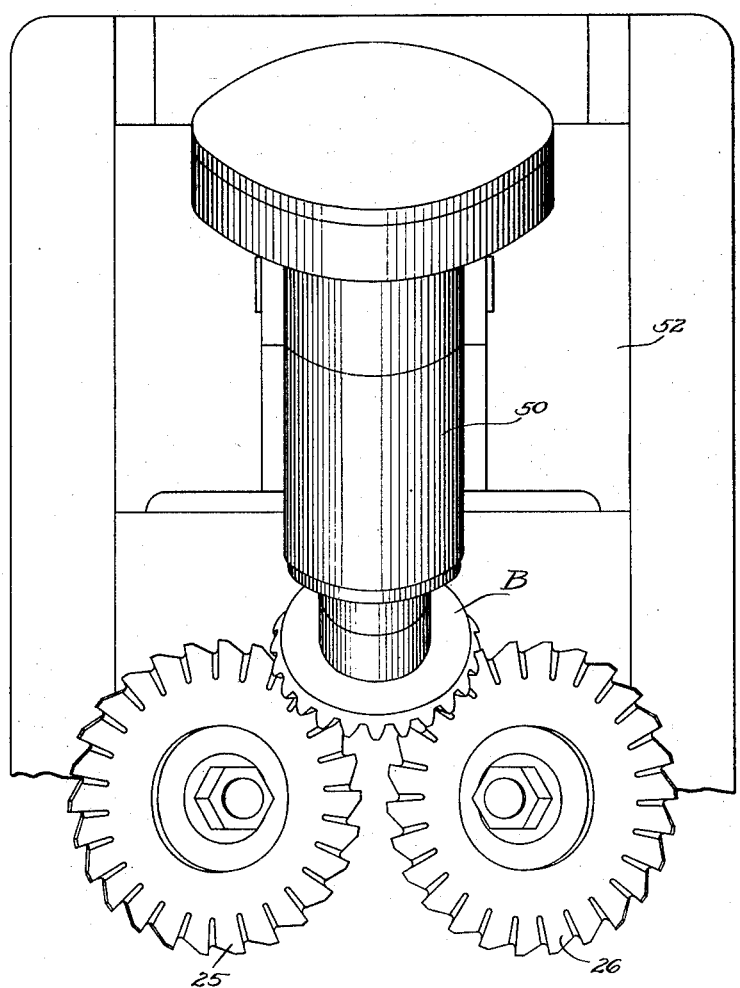
Figure 5 is a plan view of this machine.
Figure 6:
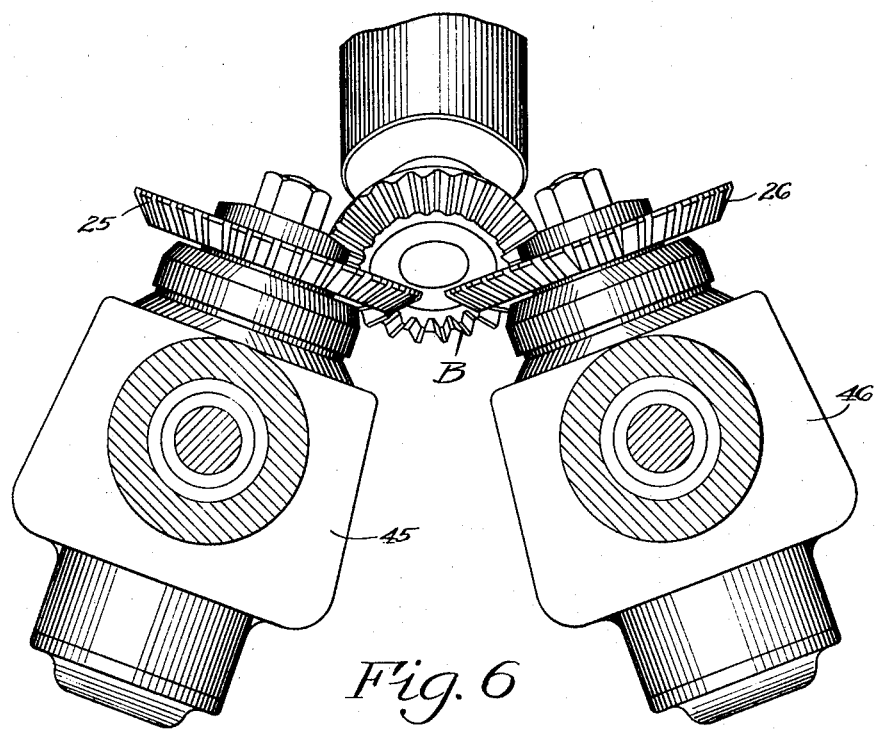
Figure 6 is a section on the line 6—6 of Figure 4, looking in the direction of the arrows.
Figure 7:
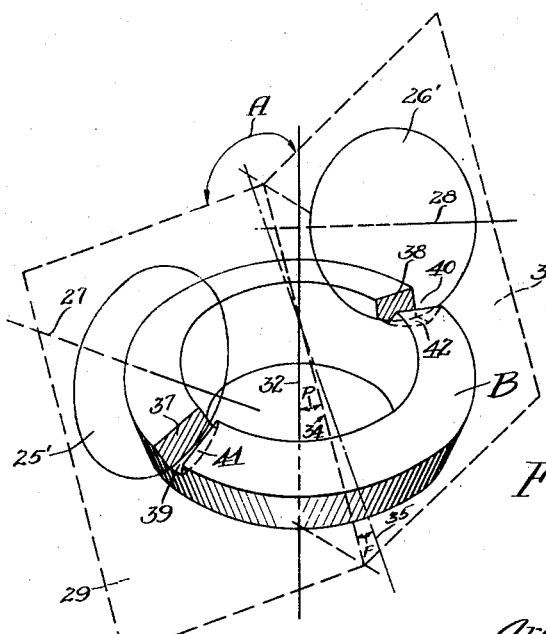
Figure 7 is a diagrammatic view illustrating the geometrical principles upon which is based the use of two cutters in cutting gears according to this invention.

Figures 4 to 6 inclusive illustrate one form of bevel gear cutting machine for carrying out the process of this invention. Here the cutters 25 and 26 are inclined to the blank in accordance with the principles above set forth. The shifting motion for the finishing cut is applied to the blank. The cutters are secured on spindles rotatably mounted in cutter heads 45 and 46 which are secured to an upright 47 mounted on a base 48. The blank B to be cut is secured to the work spindle 49 which is journaled in a work head 50 swingably mounted by means of trunnions 51 in the work head slide 52. The slide 52 is mounted on the base 48 to slide in a direction 53 inclined to the line of intersection of the plane of the finish cutting edges of the cutter corresponding to the line 35 of Figure 7.

The swinging movement of the work head 50 is controlled by a rotatable cam 55 which is rotated in any suitable manner in timed relation with a cam 56 that controls movement of the work head slide 52. There is an arm 58 secured to the work head 50 and this arm carries a roller 59 that engages in the track-way 60 of the cam 55. The work head slide 52 carries a roller 62 which engages in the trackway 63 of the cam 56.

During the roughing feed, the dwell in the track-way 60 of the cam 55 retains the work head 50 in raised position with the axis of the work spindle coinciding with the line 64. The roughing feed is produced by the cam 56. This cam may be driven in any suitable manner. When the blank B has reached full depth position, as determined by the contact of the front face of the work head slide 52 with a positive stopping surface 65 formed on the frame 48, the active portion of the track-way of the cam 55 will come into operation and oscillate the work head 50 about its trunnions 51, rocking the blank into finish cutting position with its axis coinciding with the line 66 which intersects the line of intersection of the planes of the finish cutting edges of the two cutters in the apex 68 of the blank. The positive stop 69 serves to control accurately the finish cutting position of the work head.

When the finishing cut is completed, the cam 55 lifts the work spindle away and the work head slide 52 is withdrawn by the cam 56 and the blank is indexed. The index mechanism may be of any usual or suitable construction.

In the foregoing description, particular reference has been made to the cutting of straight tooth bevel or hypoid gears having radial teeth. It will be understood, however, that the invention is applicable to the cutting of straight tooth bevel gears with non-radial or skew teeth. In the cutting of such gears, of course, the planes of the finish cutting edges of the cutters in finish cutting position will be offset from the axis of the blank in accordance with the obliquity or skew of the teeth, but the planes of the finish cutting edges of the two cutters will be inclined to one another, as already described, in accordance with the angle of convergence of the sides of the teeth of the gear to be cut and in accordance with the angular distance between the two cutters. As before, the cutters or the blanks in finish cutting position will be inclined in accordance with the pressure angles of the tooth sides being produced.

While the invention has a particular advantage in the cutting of gears having plane tooth surfaces, that is, of non-generated gears, in certain aspects the invention can be applied to the production of gears in a generating operation. Thus, for instance, the cutter or cutters might be fed into depth to rough out the tooth surfaces while the blank is held stationary and then the cutters shifted, as already described, to finish cutting position and while they were being shifted, a generating roll produced between the cutters and blank to generate the tooth profiles.

In general it will be understood that while the invention has been described in connection with particular embodiments and particular uses, the invention is capable of various further modifications and uses and that this application is intended to cover any adaptations, uses, or embodiments of the present invention following in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting the tooth surfaces of a gear which comprises adjusting a rotary milling cutter and a gear blank into operative relation and producing a relative feed movement between the cutter and the blank in a direction less inclined to the pitch plane of the blank than one side of the cutter until full depth position is reached whereby to avoid cutting the blank with said side during said feed movement, and then shifting the cutter relative to the blank to cause said side of the cutter to finish cut one side of the tooth space cut during said feed movement.

2. The method of cutting the tooth surfaces of a gear which comprises adjusting a rotating milling cutter, having side cutting edges at one side perpendicular to its axis into operative relation with a gear blank and then producing a relative feed movement between the cutter and blank along a line less inclined to the pitch surface of the blank than said side whereby to avoid cutting the blank with said side during said feed movement, and then imparting a relative shifting movement between the cutter and blank laterally with reference to the blank to cause said side cutting edges to finish cut one side tooth surface of the blank.

3. The method of cutting the side tooth surfaces of a gear which comprises providing a rotary milling cutter having cutting edges at one side lying in a plane perpendicular to its axis and cutting edges at its opposite side lying in a conical surface, positioning said cutter in engagement with a gear blank, and while rotating said cutter on its axis, producing a relative feed movement between the cutter and blank along a line less inclined to the pitch plane of the blank than is the plane side of the cutter until full depth position has been reached whereby to avoid cutting with said plane side of the cutter during said feed movement, and then shifting the cutter and blank relative to one another to cause the plane side of the cutter to sweep out a finished tooth side of the blank.

4. The method of cutting the tooth surfaces of a bevel gear which comprises adjusting a pair of milling cutters, each of which has side cutting edges on one side perpendicular to the axis of the cutter, and a gear blank into operative relation so that planes containing the described cutting edges are inclined at an angle to one another determined by the angle of convergence of opposite sides of the teeth of the gear to be cut, feeding the cutters and blank relative to one another along a line less inclined to the pitch plane of the blank than the described cutting edges to cause said cutters to take roughing cuts with their tips and with the side-cutting edges opposite to the first-named edges of the cutter only and, when full depth cutting position has been reached, shifting the cutters and blank relative to one another so that in final cutting position the axis of each cutter is inclined to a side tooth surface of the blank at an angle equal to the pressure angle of said tooth surface and so that said tooth surfaces will be finish cut by the first-named side cutting edges of the two cutters.

5. The method of cutting the tooth surfaces of a gear which comprises inclining a rotating milling cutter having side cutting edges at one side which are perpendicular to its axis, so that said side cutting edges are inclined to the pitch plane of the gear blank at an angle corresponding to the pressure angle of a tooth surface of the blank, feeding said cutter into the blank along a line so inclined to said cutting edges so as to rough out a tooth space of the blank to full depth with the tips and the opposite side cutting edges of the cutter only, and then shifting the cutter relative to the blank in a direction parallel to the pitch plane to cause said first-named cutting edges to finish cut one side of the tooth space cut in the roughing operation.

6. The method of cutting the side tooth surfaces of a bevel gear which comprises providing a pair of milling cutters, each of which has side cutting edges at one side lying in a plane perpendicular to its axis, positioning said cutters in engagement with a gear blank so that the planes of said cutting edges are inclined to one another at an angle determined by the angle of convergence of opposite sides of the teeth of the gear to be cut, feeding said cutters into engagement with the blank along a line so inclined to the line of intersection of said planes, until full depth position is reached, as to avoid cutting with the described side cutting edges and to cause the tips and the sides of the cutters opposite to the first-named sides to rough out two different tooth spaces of the blank, and then shifting the cutters relative to the blank to cause the first-named cutting edges of the cutters to finish cut opposite side tooth surfaces of said tooth spaces.

7. The method of finishing opposite side tooth surfaces of a bevel gear which comprises selecting a pair of milling cutters, each of which has side cutting edges on one side lying in a plane perpendicular to its axis, positioning said cutters relative to a bevel gear blank so that planes containing said cutting edges are inclined to one another at an angle determined by the angle of longitudinal convergence of opposite side tooth surfaces of the gear to be cut and so that the planes are also inclined to a common plane inclined to the pitch plane of the blank at angles equal to the pressure angles of the tooth surfaces to be cut, feeding the blank bodily relative to the cutters along a line inclined to the line of intersection of the planes of the cutters until both cutters have been fed into the blank to full depth position, and then shifting the blank so that its pitch cone surface is tangent to said common plane and its axis intersects the line of intersection of the planes of the cutters.

8. In a machine for producing gears, a work support, a tool support, a rotatable disc milling cutter journaled on the tool support, means for producing a relative depthwise feed movement between the cutter and blank in a direction inclined to a side tooth surface of the gear to be cut to avoid cutting with one side of the cutter, and means for shifting the cutter, after it has reached full depth position, in a direction inclined to the direction of its depthwise feed to cause said named side of the cutter to take a finishing cut.

9. In a machine for producing gears, a work support, a tool support, a rotatable disc milling cutter journaled on the tool support and having side cutting edges at one side arranged in a plane perpendicular to its axis, means for producing a relative depthwise feed movement between the cutter and work support in a direction so inclined to the plane side of the cutter that the cutter cuts on its opposite side and its tip only, and means for producing a relative movement between the cutter and work support, after full depth position has been reached, to cause the plane-side of the cutter to finish a side surface of the tooth space.

10. In a machine for producing bevel gears, a tool support, a rotary milling cutter journaled in said tool support and having side cutting edges on one side lying in a plane perpendicular to the axis of the tool support, a work support, means for feeding the work support in a direction so inclined to the cutter that the plane side of the cutter does no cutting, and means for swinging the work support angularly, after the cutter has reached full-depth position, to cause the plane side of the cutter to take a finishing cut on one side face of the blank.

11. In a machine for cutting gears, a tool support, a rotary milling cutter journaled on said support and having cutting edges on one side lying in a plane perpendicular to its axis and cutting edges on its opposite side lying in a conical surface, means for producing a relative feed movement between the cutter and work support along a line so inclined to the cutter that the plane side-cutting edges of the cutter do no cutting and means for shifting the cutter and blank relative to one another, after the cutter has reached full-depth position, to cause said plane side of the cutter to sweep out a finished tooth side of the blank.

12. In a machine for cutting gears, a tool support, a pair of disc milling cutters journaled on said support, each of which has side cutting edges on one side lying in a plane perpendicular to the axis of the cutter, a work support, means for producing a relative depthwise feed movement between the work support and cutters in a direction so inclined to the plane sides of the cutters that the opposite sides and tips only of the cutters take depthwise cuts, and means for shifting the cutters, after they have reached full-depth cutting positions, to cause the plane sides of the cutters to take finishing cuts on opposite tooth sides of the blank.

13. In a machine for cutting bevel gears, a tool support, a pair of disc milling cutters journaled on said support, each of which has side cutting edges on one side lying in a plane perpendicular to the axis of the cutter and which are mounted relative to one another so that their plane sides are inclined to one another at an angle determined by the angle of convergence of opposite side surfaces of the gear to be cut, a work support, means for producing a relative depthwise feed movement between the work support and cutters in a direction so inclined to the plane sides of the cutters as to cause the opposite sides and tips only of the cutters to take depthwise cuts, and means for swinging the work support angularly, after the cutters have reached full-depth positions to cause the plane sides of the cutters to take finishing cuts on opposite tooth sides of the blank.

14. In a machine for cutting bevel gears, a tool support, a pair of disc milling cutters journaled on said support, each of which has side cutting edges on one side lying in a plane perpendicular to the axis of the cutter and which are so disposed to one another that their plane surfaces intersect at an angle determined by the angle of convergence of opposite side tooth surfaces of the gear to be cut, a work support, means for feeding the work support into the cutters along a line so inclined to the line of intersection of the planes containing the plane side cutting edges of the cutters that the opposite side cutting edges and the tip of the cutters do the cutting, and means for swinging the work support, when full depth position has been reached, to cause the work support to assume a position in which the plane sides of the cutters finish cut opposite side tooth surfaces of the blank.

15. The method of cutting the tooth surfaces of a gear which comprises adjusting a rotating milling cutter, having side cutting edges at one side perpendicular to its axis, into operative relation to a gear blank so that the plane of said side cutting edges is inclined to the pitch plane of the blank at an angle equal to the pressure angle of the finished tooth surfaces to be cut on the blank, producing a relative feed movement between said cutter and the blank along a line less inclined to the pitch plane of the blank than said side cutting edges whereby to avoid cutting with said cutting edges until full depth position is reached, and then shifting the cutter relative to the blank to cause said side cutting edges to finish-cut one side of the tooth space cut during said feed movement.

16. The method of cutting the tooth surfaces of a gear which comprises adjusting a rotary milling cutter into operative relation with a gear blank so that the side cutting edges at one side of the cutter are inclined to the pitch plane of the gear blank at an angle equal to the pressure angle of the finished tooth surfaces to be cut on the blank by said side cutting edges, producing a relative feed movement between the cutter and blank along a line less inclined to the pitch plane of the blank than said cutting edges whereby to avoid cutting with said edges until full depth position is reached, and then shifting the cutter relative to the blank to cause said side cutting edges to finish-cut one side of the tooth space cut during said feed movement.

17. In a machine for producing gears, a work support, a tool support, a rotary disc milling cutter journaled on the tool support and having side cutting edges at one side arranged in a plane perpendicular to its axis, means for adjusting the cutter and blank into operative relation with the plane of said side cutting edges inclined to the pitch plane of the blank at an angle equal to the pressure angle of the finished tooth surfaces to be cut on the blank by said side cutting edges, means for producing a relative feed movement between said cutter and blank along a line less inclined to the pitch plane of the blank than the plane of said side cutting edges whereby to avoid cutting with said edges during said feed, and means for producing a relative movement between the cutter and blank, after full depth position has been reached, to cause the described side cutting edges of the cutter to finish a side of the tooth space cut during the feed movement.

18. The method of producing a gear which comprises positioning a milling cutter, whose opposite side cutting faces are inclined to one another at an angle equal to the included angle between opposite side tooth faces of the gear to be cut, in operative relation with a gear blank with the side faces of the cutter inclined to the pitch plane of the blank at angles equal to the pressure angles to be cut on opposite tooth surfaces of the blank, producing a relative feed movement between said cutter and blank along a line less inclined to the pitch plane of the blank than one side of the cutter whereby to avoid cutting with said side of the cutter during said feed, and when full depth position is reached, shifting the cutter and blank relative to one another in a direction parallel to the pitch plane to cause said side of the cutter to finish one side of the tooth space cut during said feed movement.

ARTHUR L. STEWART.